US00RE38148E

(19) United States
(12) Reissued Patent
Borza et al.

(10) Patent Number: US RE38,148 E
(45) Date of Reissued Patent: Jun. 24, 2003

(54) PRODDER WITH FORCE FEEDBACK

(75) Inventors: Michael A. Borza, Ottawa (CA); Patrick J. Gallagher, London (CA)

(73) Assignees: Dew Engineering and Development Limited, Ottawa (CA); Her Majesty the Queen in right of Canada, as represented by the Minister of National Defense, Ottawa (CA)

(21) Appl. No.: 10/060,374

(22) Filed: Feb. 1, 2002

Related U.S. Patent Documents

Reissue of:
(64) Patent No.: 6,023,976
Issued: Feb. 15, 2000
Appl. No.: 09/172,198
Filed: Oct. 14, 1998

(30) Foreign Application Priority Data

Oct. 14, 1997 (CA) ..... 2218198

(51) Int. Cl.[7] ..... G01N 29/12

(52) U.S. Cl. ..... 73/598
(58) Field of Search ..... 73/579, 581, 602, 73/597, 598, 661, 862.541

(56) References Cited

U.S. PATENT DOCUMENTS 5,672,825 A * 9/1997 Uno et al. ..... 73/579

* cited by examiner

*Primary Examiner*—Robert Raevis
(74) *Attorney, Agent, or Firm*—Freedman & Associates

(57) ABSTRACT

A detector for detecting detonatable devices such as land mines has a search head with a probe having a tip for placing beneath the surface of the ground. The probe tip ultrasonically provides an indication of the presence of a metal or plastic material. A force sensor coupled to the probe time provides an indication of force at the tip a it is placed beneath the ground surface. Therefore, before too much force is applied to the tip, a user is warned and accidental detonation may be prevented.

15 Claims, 5 Drawing Sheets

PRODDER WITH FORCE FEEDBACK

Matter enclosed in heavy brackets [ ] appears in the original patent but forms no part of this reissue specification; matter printed in italics indicates the additions made by reissue.

FIELD OF THE INVENTION

This invention relates generally to prodders to probe the ground for buried explosive devices such as landmines and the like, and more particularly to a method and device for providing force feedback to the prodder or the user of the device.

BACKGROUND OF THE INVENTION

Minimum metal content (MMC) mine detectors having a search head and circuitry for detecting buried non-metallic and metallic land mines are well known. For example, U.S. Pat. No. 4,016,486 in the name of Pecori assigned to the United Sates of America by the Secretary of the Army, discloses such circuitry. An MMC detector includes electronic circuitry to assist a human operator to determine the nature of a solid obstruction encountered below the surface of the ground. Typically, metals and rocks are distinguished from one another. Metals are potential land mines. A prodder capable of distinguishing threats, from non-threats reduces stress and fatigue of a human operator and speeds up the process of clearing an area of buried land mines. The search head is typically a UHF balanced bridge detector which is unbalanced by passing the search head over a soil area which has a dielectric constant different from the background. Such a condition exists when passing over a mine.

Currently, instrumented prodders are known having ultrasonic means in the form of an ultrasonic transducer at or near the probe tip that are used for characterization of buried obstructions; this device can be used in conjunction with an MMC detector wherein the MMC detector first detects the ground indicating the vicinity of a land mine, and, wherein the instrumented prodder is used to probe the earth in the vicinity of the suspected land mine, the location of which may have been isolated using the MMC detector.

A Hand held prodder having a probe in the form of an elongate, preferably non-magnetic rod including a gripping handle disposed at one end is currently known. The design of the probe is based partially upon a Split Hopkinson Pressure Bar (SHPB) apparatus. In the apparatus a compression wave or high frequency elastic mechanical pulse is delivered via a to a sample wherein a portion of the wave is reflected. Mechanical impedance is a characteristic of a material. An incident wave launched at a material will be reflected and/or transmitted from or through the material, respectively, in dependence upon the characteristics of the material. The effect of mechanical impedance on a SHPB apparatus in three instances is described hereafter:

Firstly and obviously, if the mechanical impedance of a sample under test is the same as that of an incident bar in the SHPB, there will be no reflection as the sample will be displaced in a same manner as the bar itself as the compression wave is delivered. The displacement of the end of the bar is directly proportional to the strain measured ($\epsilon$).

Secondly when the mechanical impedance of a sample is considerably greater than that of the bar, a sample's mechanical impedance tends toward being infinite and substantially the entire wave is reflected.

In a third instance when the mechanical impedance is zero, in the absence of a sample, the reflected wave is tensile but of equal magnitude to the incident wave. The phase of the wave is shifted by $\pi$ and the net stress is zero; the relative displacement at the bar end equals twice that for the first instance ($2\epsilon$).

In a SHPB device, once the relative displacement of the bars is known, the displacement of the sample is ascertained. Taking into account Young's Modulus (E) and the displacement of the bar, the imposed stress can be calculated, wherein the force applied is equal to the product of the stress and the cross-sectional area of the bar.

Since the loading on the sample becomes equal after a short time, the analysis may be somewhat simplified. Strain results may be used for only the incident bar; or alternatively, the striker bar may be directed to impact directly on the sample, and the transmitter bar alone may be used to define the sample characteristics.

It is has been found that plastics, minerals and metals may be discerned from one another by using this approach.

It has been further found that a hand held prodder having a rod modified to ba analogous to the incident bar of a SHPB may be used to detect or discern metal, plastic and rocks.

The prodder rod is provided with one or more piezoelectric transducers capable of generating an acoustic wave into the rod and for detecting reflected waves from an object contacting the end of the rod. Conveniently, signal processing means are coupled to the transducers and are provided for analyzing the detected reflected waves for determining the characteristics of the object; more especially distinguishing landmines from inert rocks. The signal processor establishes measurements of the frequency-time-amplitude characteristic of the object. The reflected waves are compared with known characteristic signatures of a plurality of materials to attempt to ascertain a match within predetermined limits.

Although instrumented prodders of this type may function satisfactorily in many instances, they suffer from a problem related to the fact that acoustic coupling at the obstruction is a function of the applied force to the probe end.

Preferably, enough force will be applied to the probe end such that characterization of the obstruction can occur without causing detonation; and, preferably, a relatively consistent force will be applied to the probe end such that an accurate determination as to the character of the buried obstruction can be made. However if too little force is applied at the probe end, a poor reading may result and a mine in the vicinity of the probe may go undetected. Too much force applied at the probe end in the vicinity of a land mine may inadvertently detonate the mine.

It is therefore an object of the invention to provide a method and device, which will overcome the aforementioned problems, related to too much force, too little force, or a varying force being applied to the probe end while in use.

It is a further object of the invention to provide an instrumented prodder for detection of land mines and the like that includes a force sensor for sensing a force such as pressure applied to an end thereof.

BRIEF DESCRIPTION OF THE DRAWINGS

Exemplary embodiments of the invention will now be described in conjunction with the drawings, in which.

DETAILED DESCRIPTION

Figure 1:
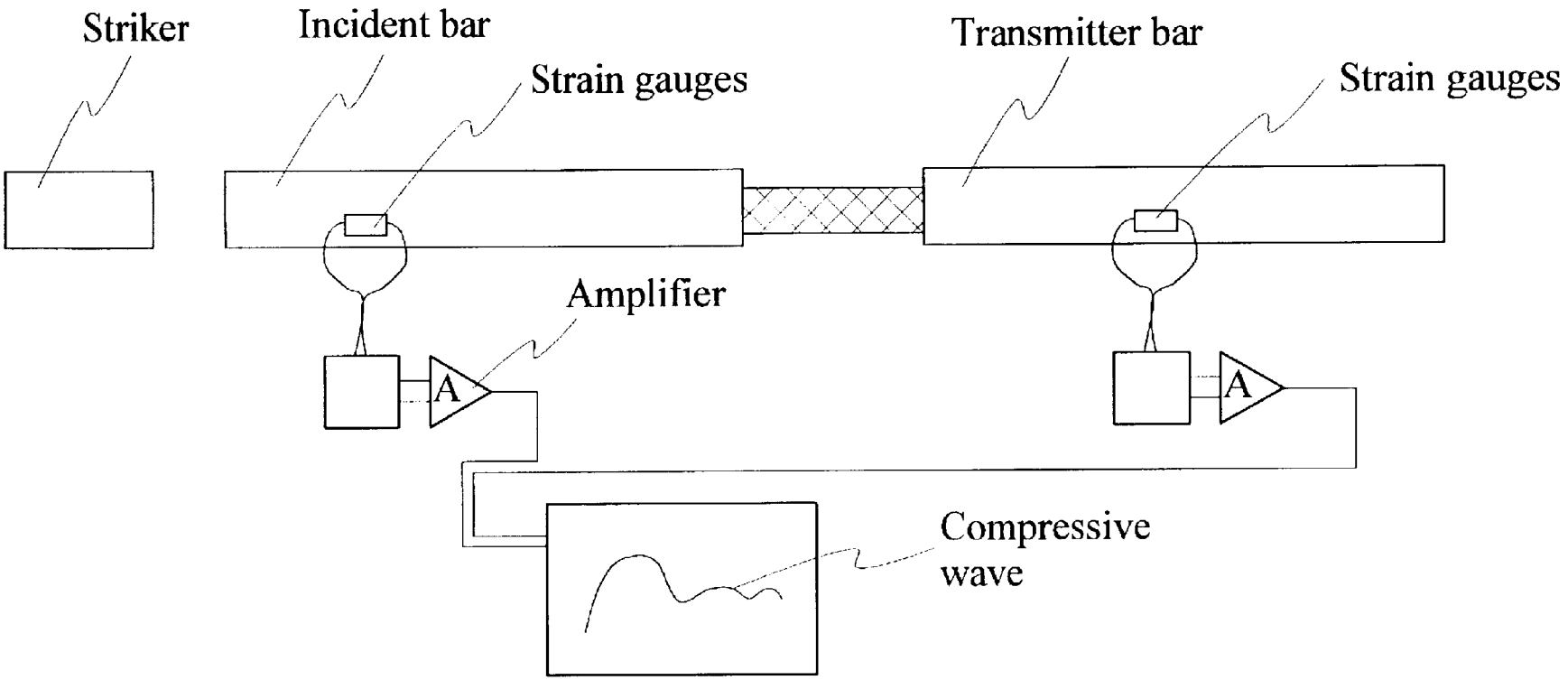
Fig. 1 (Prior Art)
FIG. 1 is a prior art circuit diagram of a Split Hopkinson Pressure Bar device.

In prior art FIG. 1 a specimen sample is shown juxtaposed between an incident bar and a transmitter bar, a strain gauge disposed one each bar provides a signal to signal processor as is described heretofore.

Figure 2:
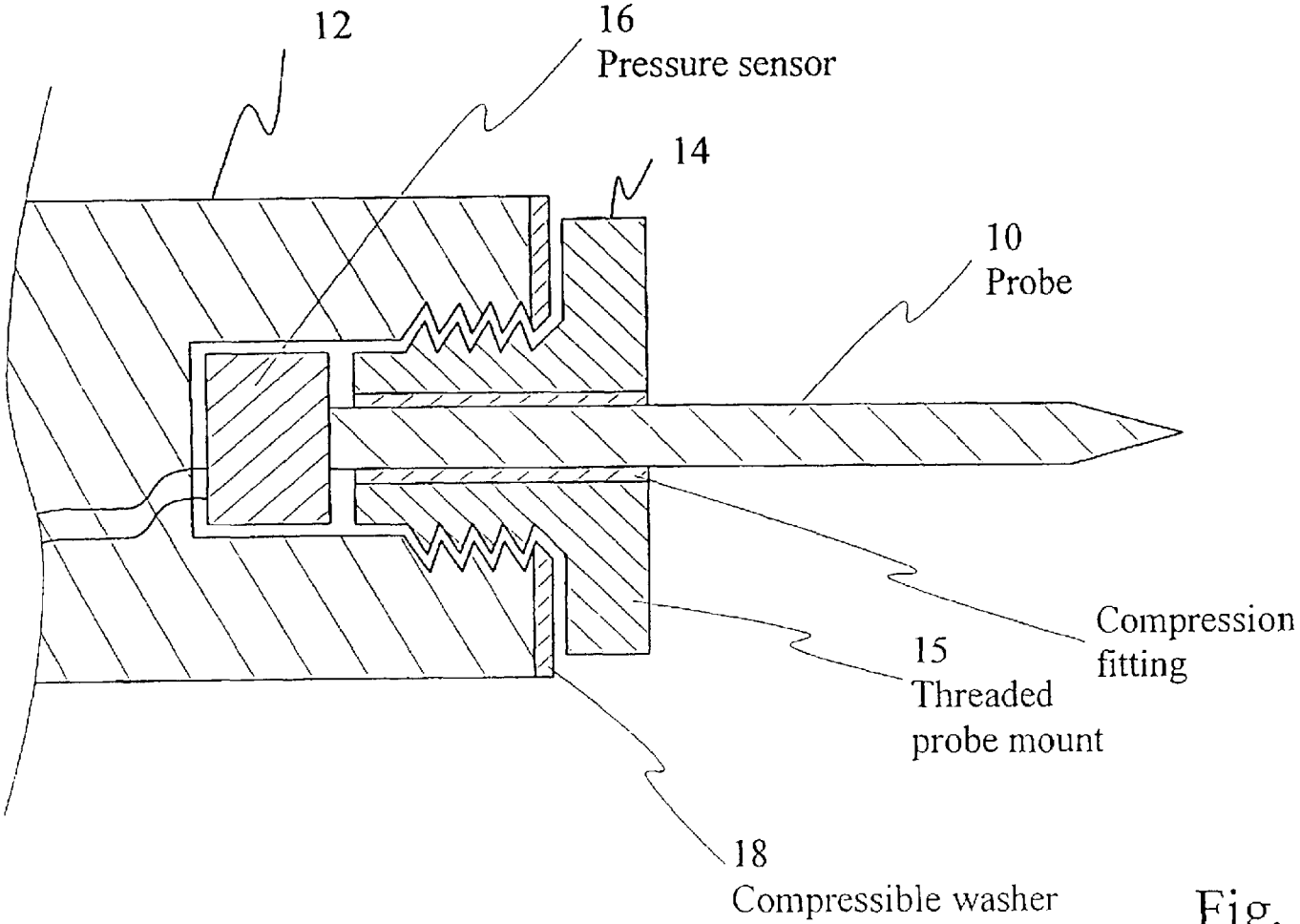
FIG. 2 is a diagram of a probe with force sensor in accordance with the invention.

Referring now to FIG. 2, an ultrasonic probe 10 for determining the character of a buried obstruction is shown in a movable mounting within housing 12. An inward end 14 of the probe 10 is coupled directly to a force sensor 16. A portion of the probe 10 shaft is tightly coupled via a compression fitting with a probe mount 15. A spacer in the form of a compressible washer 18 is disposed between an inside face of a flange of the threaded probe mount and an outside face of the housing. Intermediate the probe mount 15 and the probe tip at its outward end, resides an circuitry for controlling ultrasonic receiver and transmitter transducers for providing and receiving an ultrasonic signal. In operation, a pulse train is launched down the rod; the transducer is subsequently switched to receive mode just prior to the return echo traversing the rod length. The transducer is most conveniently provided in the form of a piezoelectric crystal affixed to a first end of the probe shaft 10. Upon application of an electric field to the crystal, a strain will occurs and a resultant mechanical energy is driven into the shaft end. Conversely, when the crystal is mechanically stressed an electric charge is produced. The crystal is electrically insulated from the probe shaft 10. A suitably programmed digital signal processor (DSP) is provided which receives digital signals from an analog to digital converter coupled to the crystal.

In operation, the DSP stores captured reflected data in a memory device. The stored data is conditioned using a stepping fast Fourier transform (FFT); the data is analyzed for frequency-time-amplitude information. A 256 point FFT from a 1024 sample is advanced in 128 sample steps producing 7 time slices of FFT data. The important characteristics corresponding to the material are typically located within approximately 15 harmonics of the FFT data.

Calibration for the probe absent a sample is performed to take into account the specific response of the probe itself including particular characteristics such as wear on the probe tip, debris that may be present on the probe, etc. This calibration data is then subtracted from the "real" acquired data in the presence of a sample.

In operation, the ultrasonic probe 10, in accordance with the invention, works in the following manner: The probe tip or prodder rod is inserted into the ground. Ultrasonic pulses are alternately launched and return echoes received by the instrumentation electronics. The return echo is modified by contact with obstructions encountered at the rod tip. The modified echoes are categorized broadly as being echoes reflected from plastic, rock or metal obstructions. Then the user is presented with a visual indication, preferably in the form of a light pattern indicating the type of obstruction. The return echo is also modified weakly by the force applied to the rod tip at the obstruction. The modification is sufficient to cause an incorrect classification; for example confusing rock for metal. By measuring the force applied to the rod tip, this effect may be compensated for. In a preferred embodiment interpolation on a force nomagraph is performed to produce a corrected echo reading that is zero-based. In less desired embodiments that are simpler to implement, an indication of a force being applied within a predetermined range may be provided, indicating an acceptable result; or an indication that excessive force is being applied, resulting in a spurious reading may be provided to the user; thereby letter s/he know that the result is not reliable. However, although these embodiments may be easier to implement, they introduce the possibility that a mine is accidentally detonated by an operator attempting to meet the force conditions imposed by the thresholds.

As pressure is applied to the tip end, the inward end 14 is forced against the force sensor 16. As a result, an electrical signal is produced that is proportional to the applied force at the probe tip. This signal can be used to sound an alarm when too much force is applied. Alternatively, the intensity of the alarm may increase/decrease or an a variable indication, dependent upon the amount of force applied may be provided. Alternatively, a visual indication of force applied in the form of a plurality of LEDs or similar indicators may be provided.

Figure 3:
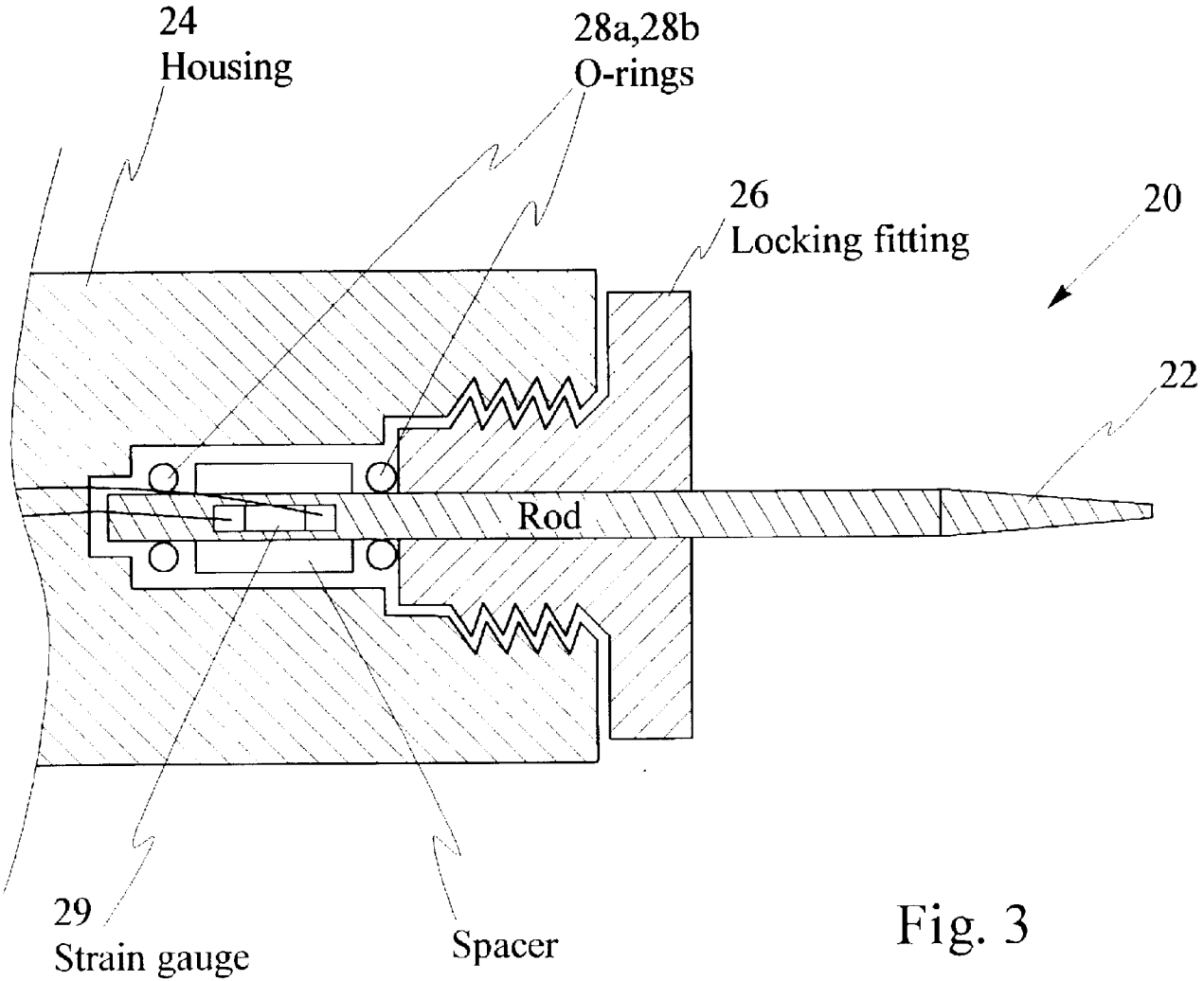
FIG. 3 is a diagram of an alternative embodiment of a probe having a rod coupled to a strain gauge cushioned by compressible o-rings.

Referring now to FIG. 3, an alternative embodiment of probe and force sensor is shown, wherein a probe 20 includes a probing rod 22, a housing 24 for receiving a non-probing end of the rod. A threaded lock fitting screw 26 having a bore through its shaft for slidably receiving the probe 20, fits tightly within the housing end and in that position lightly comprises a pair of o-rings 28a and 28b. A force transducer in the form of a strain gauge 29 is disposed along the probe between the two o-rings 28a and 28b. Alternatively, and advantageously, the strain gauge may be disposed along the rod within a void housed by the threaded lock fitting screw 26. By so doing, a more accurate and more precise determination of force upon the rod may be calculated.

Of course, other means may be envisaged for measuring or determining a force upon an end of the probing rod 22. For example, displacement of the rod with a sleeve may be used as an indicator of force. Or alternatively by measuring a compression of a compressible member coupled with the probing rod 22.

Figure 4:
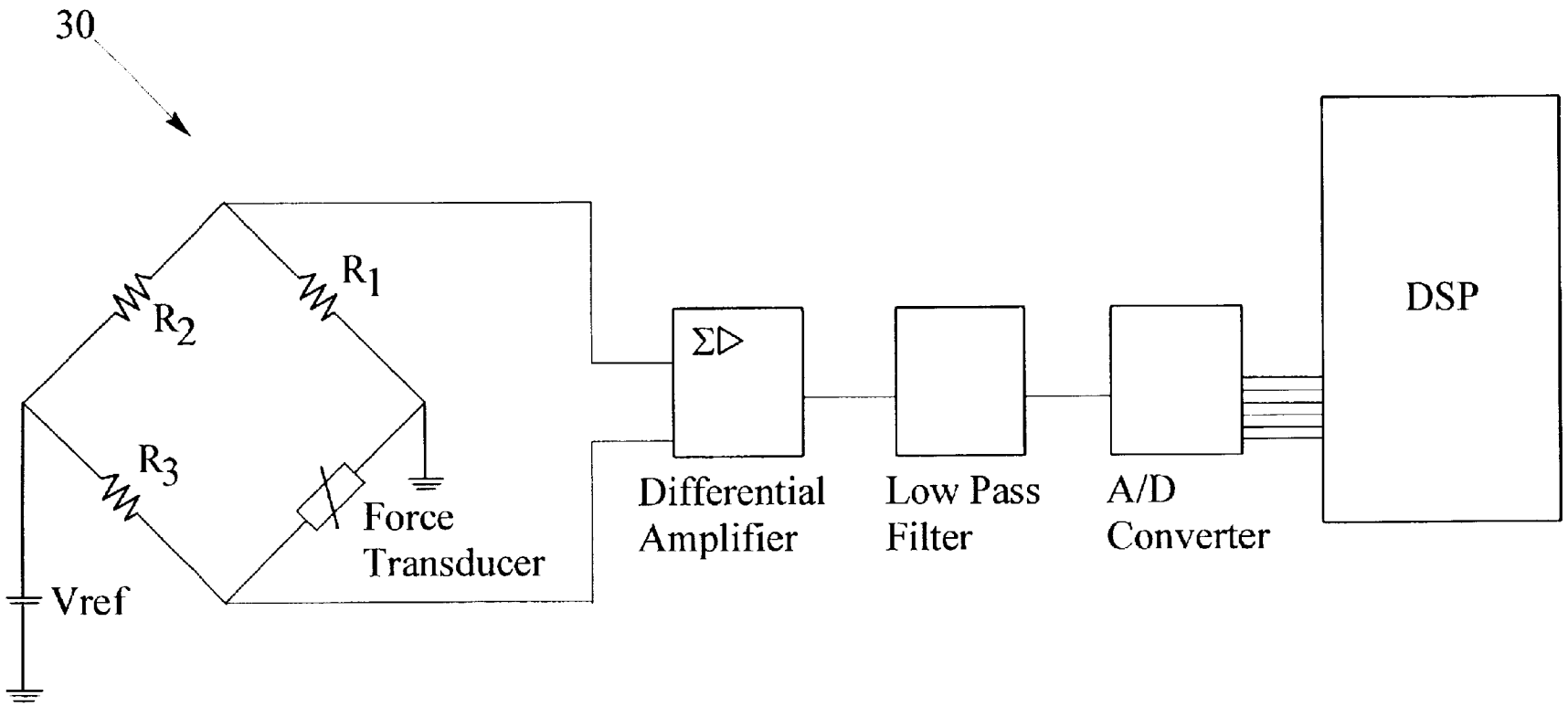
FIG. 4 is a circuit diagram for a measurement circuit for a force transducer.

FIG. 4 shows a measurement circuit for a force transducer. The circuit 30 comprises a bridge wherein three known resistors $R_1$ $R_2$ with $R_3$ are coupled with a resistive force transducer $R_{Forcetransducer}$. A differential amplifier compares outputs from divider network $R_1$ $R_2$ with $R_3$ $R_{Forcetransducer}$ of the bridge. This output is then filtered by a low pass filter and is converted to a digital signal and is provided to a signal processor. The processor may be suitably programmed to determine when a force exceeding a predetermined allowable threshold has been exceeded.

Figure 5:
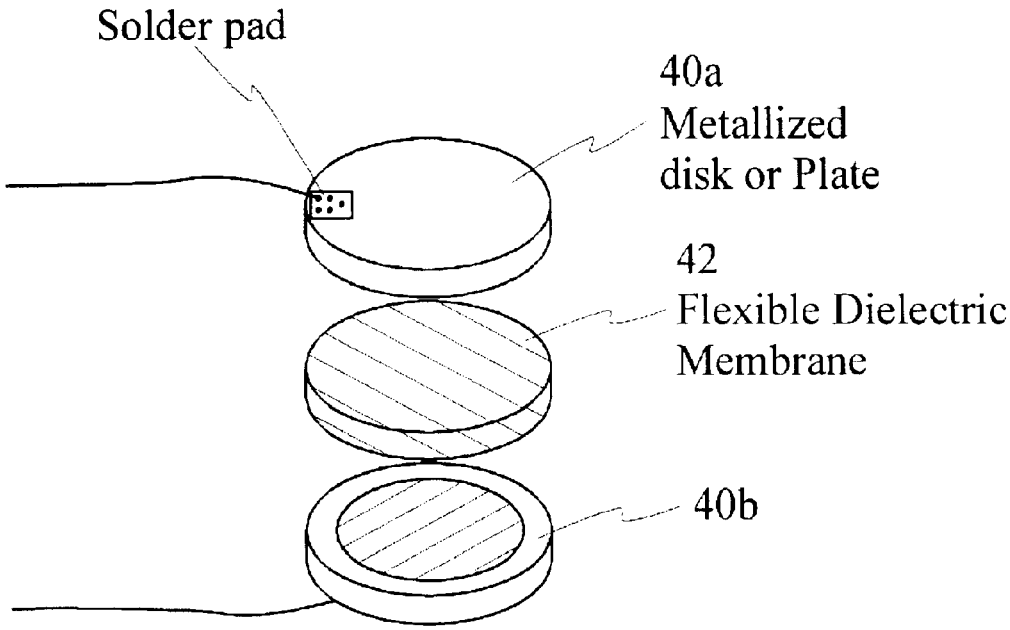
FIG. 5 is diagram of a capacitive force sensor having two metallized plates; and, FIG. 6 is circuit diagram of a measurement circuit for use with the capacitive force sensor shown in FIG. 5.

In FIG. 5, a capacitive force sensor is shown that is preferable to the force sensor described heretofore, based on more costly strain gauge technology. Furthermore the capacitive sensor in accordance with this invention, is less fragile than the aforementioned strain gauge type.

Now turning to FIG. 5 the capacitive force sensor is shown to have two metal or metallized plates 40a and 40b separated by a flexible dielectric membrane 42. The plates may be manufactured by use of conventional circuit board technology, thereby facilitating the manufacture of plates in a plurality of shapes and sizes. Furthermore, such plates 40a and 40b can be conveniently soldered to other portions of the circuit. The flexible dielectric membrane 42 is chosen to have a high permittivity and must simultaneously exhibit a relatively large mechanical strain rate in compression. For example, synthetic rubber, polyethylene, and some plastics may be used. Synthetic rubber is especially suitable providing thermal insensitivity over a wide temperature range. Alternatively, thin-film plastic typically provides a large capacitance density, reducing sensitivity of the force measurement to parasitic effects.

Figure 6:
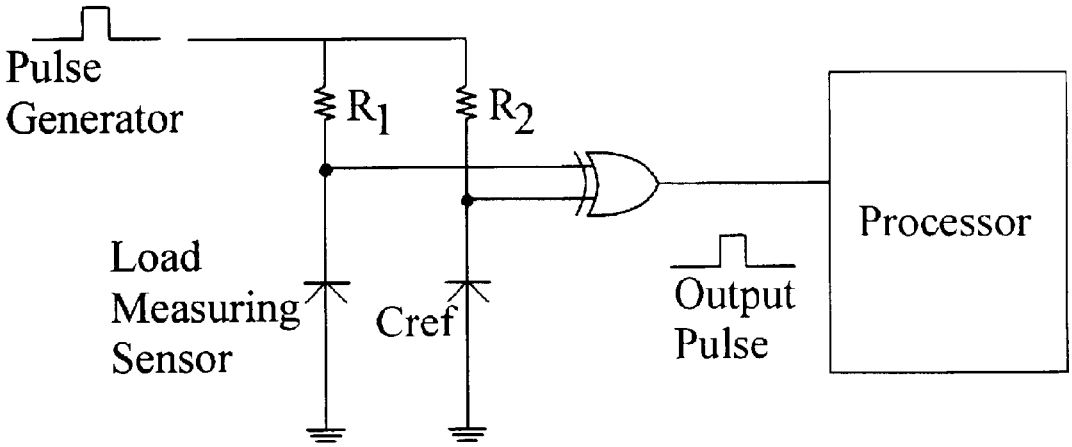

FIG. 6 shows a measurement circuit for use with the capacitive force sensor of FIG. 5. In operation, this circuit measures an applied load (to the capacitive plate 40a) by comparing a nominal capacitance $C_{ref}$ with the capacitance measured across the dielectric 42 of the force sensor shown in FIG. 4. In FIG. 6 a pulse is provided at an input terminal and distributed at a first junction to a first leg including a resistor $R_1$ in series with a capacitive force sensor capacitor; and to a second leg to a resistor $R_2$; in series with a fixed reference capacitor $C_{ref}$. This is particularly suitable for computerized applications, where the pulse generating function may be provided by the processor itself. By selecting $R_1$, $R_2$, and $C_{ref}$ appropriately, the time constant $R_2*C_{ref}$ will match the time constant due to the combination of $R_1$ and the sensor. Thus, the duration of the output pulse will be zero when no load is applied. When a load is applied to the sensor capacitor, the time constants will no longer match, producing an output pulse with a duration proportional to the applied load. Similarly, sensitivity of the measurement to ambient temperature is easily compensated for.

Of course, numerous other embodiments may be envisaged, without departing from the spirit and scope of the invention.

What is claimed is:

1. A detector for detecting detonatable devices or land mines, comprising:

a search head including a probe having a tip for placing beneath the surface of the ground, the probe tip for providing an indication of the presence of a metal or plastic material; and, a force sensor other than an operator of the prodding rod for providing an indication of a force at the tip as it is placed beneath the ground surface, the indication independent of the indication of the presence of a metal or plastic material.

2. A prodding rod having a driver portion and a sensing end for contacting an object to be detected as defined in claim 1 wherein the force sensor is positioned proximate the driver portion for sensing strain induced by the force applied at the sensing end of the rod.

3. A detector for detecting detonatable devices or land mines, as defined in claim 1 wherein the search head includes ultrasonic detection means.

4. A detector for detecting detonatable devices or land mines, comprising:

a search head including a probe having a tip for placing beneath the surface of the ground, the probe tip for providing an indication of the presence of a metal or plastic material; and, a force sensor other than an operator of the prodding rod for providing a signal that varies with a change in force applied to the tip.

5. A detector for detecting detonatable devices or land mines as defined in claim 4 wherein said means is coupled to the probe tip.

6. A detector for detecting detonatable devices or land mines as defined in claim 4 wherein said force is pressure.

7. A prodding rod having a driver portion and a sensing end for contacting an object to be detected, comprising:

means at or near the driver portion of the rod for imparting mechanical energy into the rod toward the sensing end, and for detecting a signal corresponding to a reflected wave, the signal containing information for determining a characteristic of the object;

a processor for processing the detected signal and for comparing the detected signal with a plurality of stored signals so as to categorize the object's material; and, a force sensor other than an operator of the prodding rod for sensing the force applied to the object by the sensing end of the rod, a sensed force being other than directly related to the detected signal.

8. A prodding rod as defined in claim 7 wherein the rod is non-magnetic, and where the rod includes means for indicating to a user, when excessive force is being applied.

9. A prodding rod as defined in claim 8 wherein the means for indicating force provides a visual indication.

10. A prodding rod as defined in claim 8, wherein the means for indicating an excessive force includes a capacitive force sensor.

11. A prodding rod as defined in claim 7, including means for indicating to a user, when a variable force is being applied.

12. A prodding rod having a driver portion and a sensing end for contacting an object to be detected as defined in claim 7 wherein the means at or near the driver portion of the rod for imparting mechanical energy into the rod comprises a transducer directly coupled at the driver end for electrically imparting mechanical energy into the rod which travels as a high frequency incident elastic wave from the driver end towards the sensing end and returns from the object as a reflected wave travelling towards the driver end.

13. A prodding rod having a driver portion and a sensing end for contacting an object to be detected as defined in claim 7 wherein the sensed force applied to the object by the sensing end of the rod is uncorrelated with the detected signal.

14. A prodding rod having a driver portion and a sensing end for contacting an object to be detected as defined in claim 7 wherein the force sensing means is positioned proximate the driver portion for sensing strain induced by the force applied at the sensing end of the rod.

15. A detector for detecting detonatable devices or land mines, comprising:

a search head including a probe having a tip for placing beneath the surface of the ground, the probe tip for providing an indication of the presence of a metal or plastic material; and, a force sensor other than an operator of the prodding rod for providing an indication of a force at the tip as it is placed beneath the ground surface, the indication being one of a signal indicating a suitability of the force at the tip for providing an indication of the presence of a metal or plastic material, a signal related to the force at the tip for use in determining the presence of a metal or plastic material, and a signal based on a measurement of the force at the tip.

* * * * *